United States Patent [19]

Angebaud et al.

[11] Patent Number: 5,218,637
[45] Date of Patent: Jun. 8, 1993

[54] METHOD OF TRANSFERRING A SECRET, BY THE EXCHANGE OF TWO CERTIFICATES BETWEEN TWO MICROCOMPUTERS WHICH ESTABLISH RECIPROCAL AUTHORIZATION

[75] Inventors: Didier Angebaud, Chantepie; Jean-Luc Giachetti; Louis Guillou, both of Rennes, all of France; Jean-Jacques Quisquater, Brussel, Belgium

[73] Assignee: Etat Francais, represente par le Ministere des Postes, des Telecommunications et de l'Espace, Issy Les Moulineaux, France

[21] Appl. No.: 714,120

[22] Filed: Jun. 11, 1991

Related U.S. Application Data

[63] Continuation-in-part of Ser. No. 704,891, Feb. 22, 1990, which is a continuation of Ser. No. 241,527, Sep. 7, 1988, abandoned.

[30] Foreign Application Priority Data

Sep. 7, 1987 [FR] France .................. 87 12366
Jun. 11, 1990 [FR] France .................. 90 07228

[51] Int. Cl.$^5$ ............................. H04K 1/00
[52] U.S. Cl. .................................. 380/23; 380/25
[58] Field of Search ........................ 380/23, 25

[56] References Cited

U.S. PATENT DOCUMENTS

| 4,405,829 | 9/1983 | Rivest et al. | 178/22.1 |
| 4,947,428 | 8/1990 | Guillou et al. | 380/20 |
| 5,140,634 | 8/1992 | Guillou et al. | 380/23 |

OTHER PUBLICATIONS

"The Knowledge Complexity of Interactive Proof-Systems", by Shafi Goldwasser, Silvio Micali and Charles Rackoff, 17th STOC, ACM Symposium on Theory of Computing, pp. 291–304.
"A Practical Zero-Knowledge Protocol Fitted to Security Microprocessor Minimizing Both Transmission and Memory" by Guillou et al, Proceedings of Eurocrypt 1988, Lecture Notes in Computer Sciences, pp. 123–128.
"New Directions in Crytography", IEEE Transactions on Information Theory, Nov. 1976, vol. IT-22, pp. 644–654.
ISO/CEI 9796, "Information Technology—Security Techniques—Digital Signature Scheme Giving Message Recovery", Mar. 15, 1990, pp. 1–8.
ISO/CEI 7816-2, "Identification Cards—Integrated Circuit(s) Cards With Contacts, Part 2–Dimensions and location of the contacts", May 15, 1988, pp. 1–7.
ISO/CEI 7816-3, "Identification Cards—Integrated Circuit(s) Cards With Contacts, Part 3–Electronic signals & transmission protocols", Sep. 15, 1989, pp. 1–14.
"Des procédés d'authentification basés sur une publication de problèmes complexes et personnalisés dont les solutions maintenues secrètes constituent autant d'accreditations", by Guillou et al, Proceedings de Securicom 1989, Paris, Mar. 1989, pp. 149–158.
"A 'Paradoxical' Identity-Based Signature Scheme Resulting from Zero-Knowledge", Guillou et al, Proceedings of Crypto 1988 Lecture Notes in Computer Sciences, vol. 403, pp. 216–231.

Primary Examiner—David Cain
Attorney, Agent, or Firm—Anne E. Barschall

[57] ABSTRACT

According to the invention, the chip card issues a first certificate comprising its letter of credentials (Crc), an exponential (X), an optional message (M), these quantities being signed. The security module verifies the signature and in return issues a second certificate containing its letter of credentials (Crm), an exponential (Y), an optional message (M'), a cryptogram (C), these quantities being signed. A common secret key is constituted between the card and the security module by the exponentials and allows the card to interpret the cryptogram addressed to it and to act in accordance therewith.

16 Claims, 5 Drawing Sheets $\text{①} \, \text{②} \cdots \text{ⓡ}_k \, ?$ $f(m, r_1^2 \bmod N, \ldots, r_k^2 \bmod N) = D = d_1 d_2 \ldots d_k$ $t_i = r_i B^{d_i} \bmod N$ $M = m, I, d_1 \ldots d_k, t_1 \ldots t_k$ $f(m, t_1^2 J^{d_1} \bmod N, \ldots t_k^2 J^{d_k} \bmod N) \stackrel{?}{=} d_1 \ldots d_k$

FIG.5

$\text{①} \, \text{②} \cdots \text{ⓡ}_k \, ?$ $D = d_{11} \ldots d_{1n}, d_{21} \ldots d_{2n}, \ldots, d_{k1} \ldots d_{kn}$ (kn bits)

$= f(m, r_1^2 \bmod N, \ldots r_k^2 \bmod N)$ $t_1 = r_1 B_1^{d_{11}} B_2^{d_{12}} \ldots B_n^{d_{1n}} \bmod N$

- - - - - - - - - - - - - - - - - - - -

$t_i = r_i B_1^{d_{i1}} B_2^{d_{i2}} \ldots B_n^{d_{in}} \bmod N$

- - - - - - - - - - - - - - - - - - - -

$t_k = r_k \cdot B_1^{d_{k1}} B_2^{d_{k2}} \ldots B_n^{d_{kn}} \bmod N$ $M = m, I, D, t_1 t_2 \ldots t_k$ $f(m, t_1^2 J_1^{d_{11}} \ldots J_n^{d_{1n}} \bmod N, \ldots t_k^2 J_1^{d_{k1}} \ldots J_n^{d_{kn}} \bmod N) \stackrel{?}{=} D$

FIG.6

$$D = f(m, r^P \bmod N)$$

$$t = r \cdot B^D \bmod N$$

$$M = m, I, D, t$$

$$f(M, t^P J^D \bmod N) \stackrel{?}{=} D$$

METHOD OF TRANSFERRING A SECRET, BY THE EXCHANGE OF TWO CERTIFICATES BETWEEN TWO MICROCOMPUTERS WHICH ESTABLISH RECIPROCAL AUTHORIZATION

This is a continuation-in-part of application Ser. No. 07/704,891, filed Feb. 22, 1990, which is a continuation of application Ser. No. 07/241,527, filed Sep. 7, 1988, now abandoned, which is incorporated herein by reference.

The present invention has for its object to provide a method of transferring a secret between two microcomputers.

The invention is used in the realisation and use of microcomputer cards, commonly denoted "chip cards", mainly in the case in which these cards can be divided between a plurality of applications (the so-called "multi-service" or "multi-use" cards).

One of the problems posed by these cards is the transfer, from a security module provided with a microprocessor, also called a terminal, of a secret or a command to a microcomputer card.

The techniques used at present to solve this problem, make use of secret key cryptographic algorithms, with a secret key hierarchy. The issuer of these cards has the disposal of a master key, which is diversified to the cards as secondary keys, as a function of the data which varies from one card to the other (serial number of the chip or account number of the owner of the card, for example).

Thus, each bank card with chip issued nowadays (personalised mask M4 in the B0 mode) is provided with a diversified key. Each security module has the disposal of the master key. Internally it recreates the diversified key of the card to which it addresses itself, thereafter it utilises this key to verify the results it receives and to protect the actions it controls.

In more recent masks, there is one (or a plurality) of sets of cryptographic keys in each card. The keys utilised to guarantee the origin of the data (integrity keys) are different from the keys used to protect the secrecy of the data (confidentiality keys). This is the case in the masks PC2, MP and TB100 developed by BULL CP8 and by PHILIPS to be shared between a plurality of uses).

In the cards which are sharable between several applications, a master file (abbreviated to MF) can create dedicated files (DF). Putting the multi-use cards into effect requires that the authority having issued the cards dedicates a portion of its power to the dedicated files by assigning a portion of the resources of the cards to them. It must therefore be possible for several dedicated files to coexist in one and the same card, without the security of one of them affecting the security of the others.

At present, a master key of the issuer must be made operative in a security module to open up a new usage in a chip card. The first keys of a supplier of services are then transmitted to the card under the protection of a key belonging to the issuer of the card.

It is rather unsafe to incorporate master keys in modules of a relatively anonymous security and distributed in large number in a rather badly controlled environment, or to distribute actual secrets under the control of the secrets of another party, even the issuer of the cards.

The present invention provides a method of avoiding such a hierarchy of secret keys and the constraints caused in the dedicating actions. The security modules are then made personal, just as the cards. However, these mechanisms take regard of the master file and dedicated file (MF and DF), which are essential for the security architecture of chip cards.

Before the invention will be described we briefly recall to mind what are the known tools which are customarily put into effect in this type of technique. For more detailed information, reference is made to the French Patent Specification FR-A-2 620 248 granted to the present Applicants for "Proce'de's d'authentification d'accre'ditations ou de messages a' apport nul de connaissances et de signature de messages" corresponding U.S. application Ser. No. 704,891, filed Feb. 22, 1990, as well as to numerous other references therein, which are all incorporated in the present application by reference.

A method based on the identity and on a public key technique is used at present in France to complete the authentification of chip cards. A precise description is found in the document entitled "Specifications et normes de la carte a memoire bancaire". This document (first edition, January 1984) can be obtained from the "Groupement des Cartes Bancaires", 29, Rue de Lisbonne, Paris, 16$^{th}$.

Each chip card includes an identification value. It is an integer number inscribed in the form of a bit train. This integer number is read by the verifier checking it, thanks to the key published by the bank authority. By raising such an integer to the third power and by keeping the remaining portion of the division by a number n published by the bank authority, one must find a bit train, the first half of which is identical to the second. In each half there are several information components which can be read elsewhere in the card: the number of the bank count of the carrier, serial number of the chip card, period for which it is valid and user codes. The bit trains encoding these information components constitute the identity of the card in the wide sense of the term.

The check on the authentification values is effected outside the cards, since the chips available do not have sufficient capacity to effect the relevant arithmetical calculations.

However, at present, new components for chip cards are in the final stage of development. For example the microcomputer 83C852 of PHILIPS RTC performs various arithmetical calculations with improved performance. With these components, several techniques on the basis of public key figures become suitable for practical usage, more specifically:
  the exponentiation in finite fields, which allow them to be put into the key,
  the digital signatures, which allow the calculation of the accreditations,
  the zero-knowledge techniques which allow authentication and signing thanks to the accreditions. These three techniques will now be briefly reviewed.

1. The exponentiation in finite sets.

The exponentiation in finite sets renders it possible for two security microcomputers to establish a common secret key via a link whose integrity is ensured, but not the confidentiality. This procedure has been described for the first time in an article by Whitfield DIFFIE and Martin HELLMAN, entitled "New directions in Cryptography", published in the periodical "IEEE Transactions on Information Theory", November 1976, Vol.

IT-22, pages 644-654. In this method the two security microcomputers are publically brought into agreement on the use of a large finite set which has a commutative multiplication law. This set may be:

a finite field having for its characteristic a prime number p defined on about 500 bits, the base of the exponentiation being a primitive element a of the field (that is to say that its consecutive modulo-p powers describe all elements of the field); the prime number can advantageously be such that $(p-1)/2$ is also a prime and has the form $2^{512}+\_b$, wherein b has at least 20 bits; the base a can advantageously be represented by a byte;

an extension field by two on the basis of the $1000^{th}$ extension, the base of the exponentials then being the root of a primitive polynomial;

the group of the points of an elliptic curve on a finite field.

By way of illustration, the first example will be considered hereinafter. It will be noted that the caller can indicate to the called party the chosen parameters a and b for the case in which there would be no standardized values for this usage.

Each security microcomputer selects randomly and in secret a positive integer number less than p which will be used as the exponent. It will be noted that x and y are the two exponents thus selected. Each microcomputer calculates the corresponding exponential, that is to say respectively:

$$X = a^x \bmod p$$

$$Y = a^y \bmod p$$

Thereafter the microcomputers exchange their results; each raises the value it receives to its own secret exponent. The exponential function being commutative, the two security microcomputers arrive at a common secret key K:

$$K = X^y \bmod p = a^{xy} \bmod p$$

$$K = Y^x \bmod p = a^{xy} \bmod p.$$

A third microprocessor, which observes the exchanges X and Y, will not succeed in establishing the key K, as, in the large finite sets considered, it is not known how the exponential function must be inverted. All algorithms known for the computation of discrete logarithms rapidly become ineffective when the dimension of these finite sets increases.

Anyway, it should be noted that a third microcomputer, inserted in the link can constitute on the one hand a key K' and on the other hand a key K", without this being noticed by the security microcomputers. So as to be suitable for use, such a protocol must then be completed by an authentification procedure or by a signature.

2. The public-key digital signature diagrams.

A digital signature in the electronic exchange of information is the equivalent of a manual signature in the conventional mail.

In all public-key digital signature organizations, a secret key is made effective in a "signature operation" to sign messages, and a public key is put into effect in a "verification operation" for verifying the signatures. A pair of keys is consequently composed of a "secret signature key" and a "public verification key".

Two types of digital signature organizations have been clearly defined and identified:

when the verification operation requires the message as its input element, the diagram is a "signature with appendix organization"; the calculation of the appendix utilises a compression function, when the verification operation reveals at the same time the message and its specific redundancy, sometimes denoted "message shadow", the organization is a "signature organization re-establishing the message".

In the latter case, the message may be the result of a compression of a further, longer message, which is sometimes denoted "imprint of a message". By applying to a message a compression function given an imprint of 128 bits, and thereafter applying to the imprint a signature organization which re-establishes the message, it is advantageously possible to effect a "signature with imprint" organization, which is a special case of the signature with appendix organization. Certain dispositions made during the study have for their object to distinguish clearly between the two operations: the signing of a message and the signing of the imprint of the message.

At present, the International Standards Organization (ISO) defines a signature organization which re-establishes the message ISO/CEI DIS 9796) and compression functions for the digital signatures (ISO/CEI DP10118). The two propositions are described in detail herebelow.

2.1 The signature diagram ISO/CEI 9796.

The entity which has to sign is provided in private and in security with a pair of keys. These keys are advantageously selected in accordance with the instructions of the project of the international standard ISO/CEI DIS9796, "Schema de signature numerique retablissant le message". This organization is derived from the algorithm RSA (named after its inventors RIVEST, SHAMIR and ADLEMAN). It is applied to the even exponents and acts on the elements lower than n/2 in the modulo-n ring of integers. This set, provided with adding and multiplying laws, also has a ring structure. The operations in this ring will be denoted "mod*n".

A modulus n is the product of two prime odd numbers which are randomly selected and kept secret. If the verification exponent is even, then one of the two prime numbers must be congruent with 3 modulo 8 and the other with 7 modulo 8. There is a unique integer number k such that the modulus is comprised between the $(k-1)^{th}$ and the $k^{th}$ power of 2. Thus, the arithmetical modulus is encoded by a train of k bits having a most significant bit 1 and a less significant bit 1. The public verification key comprises the modulus n and the verification exponent v. The secret signature key comprises the signature exponent s.

The message to be signed is a bit train of limited length. By filling it up with 0 to 7 most significant zeros, a train of z bytes is obtained. The maximum length of the message to be signed is a function of the length of the modulus: 16z must be smaller than or equal to $k+2$.

The number t is defined as being the lowest integer number such that a train of 2t bytes will be longer than or equal to $k-2$ bits. For a possible extension repeating the z bytes to obtain t bytes and by the inserted introduction of t redundancy bytes to double the length whilst marking the exact limit of the message, a train of 2t bytes is obtained which encodes the "message with redundancy".

Thereafter, a train of k−1 bits is constructed having one most significant bit 1 followed by k−2 least significant bits of the message with redundancy, apart from the least significant byte which is replaced to force the least significant quartet to 6. These precautions (most significant bit 1 and least significant quartet of 6) render it possible to oppose several known attacks on the algorithm RSA. This train of k−1 bits encodes "the integer with redundancy".

The representative element is equal to the integer with redundancy except when v is even and the Jacobi symbol of the integer, with respect to the arithmetical module 1, is −1. In this case it is equal to the integer divided by two. Thus, when the exponent v is even, the Jacobi symbol of the representative element relative to the modulus n is forced to +1 taking into account constraint that one of the factor is congruent with 3 modulo 8 and the other with 7 modulo 8. These precautions complete the earlier precautions to allow the use of even exponents.

By raising a representative element to the power s mod*n, the authority obtains the signature of the message.

To verify a signature, it is necessary to raise it to the power v mod*n. Thereafter, it is necessary to re-establish the integer number with redundancy which is encoded by a train of k−1 bits having a most significant bit 1 and a quartet of least significant bits at value 6. Thereafter, it is necessary to re-establish a train of 2t bytes with the k−2 least significant bits of the integer number with redundancy and 0 to 15 most significant zeros. Finally, it is necessary to test the redundancy of these 2t bytes before the re-established message is extracted therefrom when the signature has been accepted.

2.2 The compression functions.

In many mechanisms intended to protect the integrity (authentication and signature), there is a need for pseudo-random functions which convert the random bit trains into bit trains of a given limited length. Such a function can be utilised to:

reduce a message to a print before this print is signed (in accordance with, for example, the standard ISO/CEI 9796), reduce a data element train into a print or into a pseudo-challenge, simulate random choices, diversify a basic value, or commit oneself to a value without revealing it.

These compression functions must resist the occurrence of collisions. This means that it must practically be impossible to find two bit trains at the input which give the same results at the output.

Certain propositions are particularly alluring, such as the algorithm MD4 ("Message Digest Algorithm", published by "RSA Security Incorporated") designed by Ron RIVEST of the Massachusetts Institute of Technology and which gives the results in 128 or 256 bits.

3. The zero-knowledge techniques.

The notion "zero-knowledge technique" has been introduced in May 1985 in a publication by Shafi GOLDWASSER, Silvio MICALI and Charlie RACKOFF, entitled "The Knowledge Complexity of Interactive Proofs", published in "Proceedings of the 17$^{th}$ STOC, ACM Symposium on Theory of Computing", pages 291–304.

These techniques allow a natural evolution of the methods (authentication values and certified identities) used in France to complete the authentification of various chip cards.

Nowadays, the authentication values of bank cards and the certified identities of telephone cards are read by the verifier which controls them thanks to the public keys of the bank authority or of France Telecom.

In future, for each application, the security microcomputer will have assigned to it a public "credential" Cr and a secret accreditation B. An accreditation quantity is a bit train of finite length containing several data elements: a name (carrier, authority issuing the card), a period for which it is valid, the accessible services, even the serial number of the microcomputer. The accreditation is obtained by the signature of the credential.

The zero-knowledge techniques render it possible for a security microcomputer to convince another microcomputer that it has the solution for a complex problem without revealing the solution. Thus, the solution (in practice an accreditation obtained by the signature of a credential) can be used as many times as is necessary without the secret being disclosed.

Summarizing the above, an authority accredits security microcomputers which thereafter prove their identity and their rights to verifiers which are, in actual practice, often other security microcomputers.

The authority is characterized by its public verification key. It must utilise and keep secret the corresponding signature key.

The security microcomputer is characterized by its credentials. It must utilise and keep secret the corresponding credentials.

The verifier is anonymous. It need only know and utilise the public elements of the data: the verification key published by the authority and the credentials outputted by the security microcomputer.

To explain in greater detail this technique, there must successively be described:

an accredition operation utilised by an authority to accredit the secret microcomputers, an interactive authentification, during which a verifier authentifies a security microcomputer, an organization for digital signation by means of an appendix comprising the signing and verifying operations.

3.1 Accreditation operation.

Each authority which gives an accreditation is given privately and in security a pair of keys, in accordance with the standard ISO/CEI DIS9796, "Digital Signature scheme giving message recovery". The public key includes a modulo n and a verification exponent v: the secret key includes a signature exponent s. The modulus n is encoded as a string of k bits, as explained hereinbefore.

The authority calculates privately and in security the accreditation from the credential quantities (corresponding to the message to be signed in the standard 9796) in accordance with the instructions of ISO/CEI DIS9796, with the exception that the secret exponent s is replaced by −s. By raising a representative J (corresponding to the representative element in the standard 9796) to the power −s mod*n, the authority obtains the accreditation B. The notation "mod*n" has for its meaning: take the rest of the division by n, keep thereafter this rest or its n-complement, which ever is smaller.

An accreditation B, a representative J and a credential Cr verify the equation given hereinafter in which the function "Red" summarises the rules prescribed by the standard ISO/CEI DIS9796 to constitute a representative on the basis of a credential (a "representative element" and an "assigned message", respectively, in DIS9796). Consequently, an accreditation B may be considered as being the secret solution of an equation in which all the other parameters are public: J is the representative derived from the credential Cr; v and n constitute the public key of the issuing authority:

$$J = \text{Red}(Cr) \text{ and } J B^v \bmod{}^* n = 1.$$

The authority enters privately and securely a credential Cr and an accreditation B into the microcomputer. This operation is called "emission" when the inscription is effected into the master file (MF) or "delegation" when the inscription is effected into a dedicated file (DF). An accreditation must be kept secret for all the files other than the authority and the security microcomputer concerned. By outputting the credential Cr, a security microcomputer therefore claims to know the corresponding accreditation B.

The French Patent FR-A-2 620 248 cited above, shows how such accreditations can be used to authenticate the security microcomputer and to authenticate and sign the messages received or transmitted by this security microcomputer. This authentication, denoted GQ after GUILLOU-QUISQUATER, the names of their inventors, is effected in four stages and three exchanges, as will now be described in greater detail.

3.2 Authentication GQ in four stages and three exchanges.

The security microcomputer, issuing its credential Cr, randomly selects an element r from the set of integers $\bmod{}^* n$, thereafter calculates $\bmod{}^* n$ the $v^{th}$ power of this element r. The result is an initial evidence Tb; the microcomputer transfers the initial evidence Tb to the verifier, thereafter the verifier randomly selects a challenge d from 0 to v−1 and transfers it to the microcomputer, the security microcomputer calculates $\bmod{}^* n$ the product of the element r and the $d^{th}$ power of the secret accreditation B; the result is the answer D; the microcomputer transfers the answer D to the verifier, the verifier calculates $\bmod{}^* n$ the product of the $v^{th}$ power of the answer D and the $d^{th}$ power of the representative J corresponding to the credential Cr; the result is a final evidence Tf; the authentication is successful when the final evidence Tf is equal to the initial evidence Tb'.

There are consequently the following relations:

$$Tb = rV_{\bmod{}^* n}$$

$$D = rB^d \bmod{}^* n$$

$$J = \text{Red}(Cr)$$

$$Tf = D_j^{v,d} \bmod{}^* n$$

3.3 Scheme GQ of the digital signature with appendix.

The scheme GQ can also serve for the digital signature with appendix. Every signature scheme is composed of a signature operation and a verifying operation:

Signing operation:

the security microcomputer, having the credential Cr, randomly selects an element r from the set of integers $\bmod{}^* n$, and calculates $\bmod{}^* n$ the $v^{th}$ power of this element; the result is the initial evidence Tb, thereafter the microcomputer applies a compression function "Hash" to a bit train containing the message M to be transferred to the verifier and the initial evidence Tb; on the basis of the result of this compression, the microcomputer works out an initial pseudo-challenge Tb having a value from 0 to v−1, for example by selecting the least significant bits; finally, the microcomputer calculates $\bmod{}^* n$ the product of the element r and the $db^{th}$ power of its secret accreditation B; the result is the answer D.

There are therefore the following relations:

$$Tb = r^V \bmod{}^* n; \ db = \text{select } (\text{Hash}(M, Tb));$$

$$D = rB^{db} \bmod{}^* n$$

The appendix signing the message M is composed of the credential Cr, the initial pseudo-challenge db and the answer D.

Verifying operation:

the verifier calculates $\bmod{}^* n$ the product of the $v^{th}$ power of the answer D and the $db^{th}$ power of the representative J corresponding to the credential Cr; the result is the final evidence Tf, thereafter the verifier applies the compression function "Hash" to a bit train containing the received message M and the final evidence Tf; the verifier works out the final pseudo-challenge df by selecting the bits in the same manner as the microcomputer.

There are consequently the following relations:

$$J = \text{Red}(Cr); \ Tf = D^{v,db} \bmod{}^* n$$

$$df = \text{select } (\text{Hash}(M, Tf))$$

The signature is accepted when and only when the final pseudo-challenge df is equal to the initial pseudo-challenge db.

The schemes GQ were the subject of several publications:

"A practical zero-knowledge protocol fitted to security microprocessor minimizing both transmission and memory" by L. GUILLOU and J. J. QUISQUATER, in "Proceedings of Eurocrypt '88, Lecture Notes in Computer Sciences", published by Springer Verlag, Vol. 330, pages 123–128.

"A paradoxical identity-based signature scheme resulting from zero-knowledge" by L. GUILLOU and J. J. QUISQUATER, in "Proceedings of Crypto '88, Lecture Notes in Computer Sciences", published by Springer Verlag, Vol. 403, pages 216–231.

"Des proce'de's d'authentification base's sur une publication de proble'mes complexes dont les solutions maintainues secre'tes constituent autant d'accre'ditations", by J. J. QUISQUATER and L. GUILLOU, in "Proceedings de Securicom'89, Paris", March 1989, pages 149–158.

After these references to the prior art, the invention will now be described, it being understood that the problem solved by the invention, as indicated in the foregoing, is the problem of transferring a secret and/or of controlling an action between two microcomputers which establish reciprocal authentification, without a previously shared secret and without a common cryptographic algorithm.

Put more precisely, the method according to the invention is characterized in that:

a) a first authority entitled to issue cards which have previously been provided with a first public key constituted by a first modulus, a first verification exponent and a first signature exponent, and each card having been defined by an accredition obtained by signature of a credential, which signature can be verified with the aid of this first public key;

b) a second authority entitled to issue security modules which have also previously been provided with a second public key constituted by a second modulus, a second verification exponent and a second signature exponent, and a security modulus having been defined by an accreditation obtained by signature of a credential, which signature can be verified with the aid of the second public key, c) finally, the first and second microcomputers having previously publicly agreed to the use of exponentials in a finite set suitable to establish a common transitory key, this method then comprises the five following operations:

A) in a first computational stage, realised by the microcomputer of the card, this microcomputer calculates an exponential X, an optional message M and a signature of X and M, this signature being verifiable with the aid of the first public key, B) in a first data transfer, the microcomputer of the card transmits towards the microcomputer of the security module a first certificate which comprises the credentials of the card as well as the signature of X and M, C) in a second computational stage, realised by the microcomputer of the security module, this microcomputer verifies, with the aid of the first public key, whether the certificate it has received has been properly signed by the card, and, if so, calculates the exponential of the exponential X it has received, which constitutes a common transitory key, then calculates an optional message M', its own exponential Y and thereafter works out a cryptogram from the common transitory key and from the secret to be transmitted and signs M', Y and C, D) in a second data transfer, the microcomputer of the security module transmits to the microcomputer of the card a second certificate which comprises the credential of the module as well as the signed Y, M' and C, E) in a third computational stage, realised by the microcomputer of the card, this microcomputer verifies with the aid of the second public key whether the certificate it has received from the microcomputer of the security module has indeed been signed thereby and if so, it calculates the exponential of the exponential Y it has received which gives it the common transitory secret key by means of which it can extract from the cryptogram the secret it contains and which is intended for it.

Obviously if the first and the second authorities are one and the same, this authority can only utilise one single public key, the first and the second keys then being amalgamated.

Preferably, the exponentials over a finite set utilised for the two micro-computers are exponentials over a finite field having for its characteristic an integer number p and a base at which is a primitive element of the field, the microcomputer of the card then randomly selecting in the first computational stage A a positive exponent x which is less than p and calculating the corresponding exponential ($X = a^x$ mod p), the microcomputer of the security module thereafter selecting, in the second computational stage C, a positive integer y less than p and calculating the corresponding exponential ($X = a^Y$ mod p) and raising the exponential x to the power y, i.e. $(a^x)^Y$ mod p, which constitutes the common transitory key, the microcomputer of the card thereafter raising, in the third computational stage E, the exponential Y to the power x, or $(a^Y)^x$ mod p, which gives it the common key.

Preferably, again the microcomputer of the security module calculates the cryptogram on the basis of the common transitory key and of the secret by an exclusive-OR operation, and the microcomputer of the card extracts the secret from the cryptogram it has received on the basis of the common transitory key by the same exclusive-OR operation.

The characteristics of the invention will become more apparent from the following description, and from embodiments given by way of non-limitative example.

BRIEF DESCRIPTION OF THE DRAWINGS

The figures are as follows:

FIGS. 5, 6 likewise illustrate a signing process for the techniques S and FS;

Figure 1:
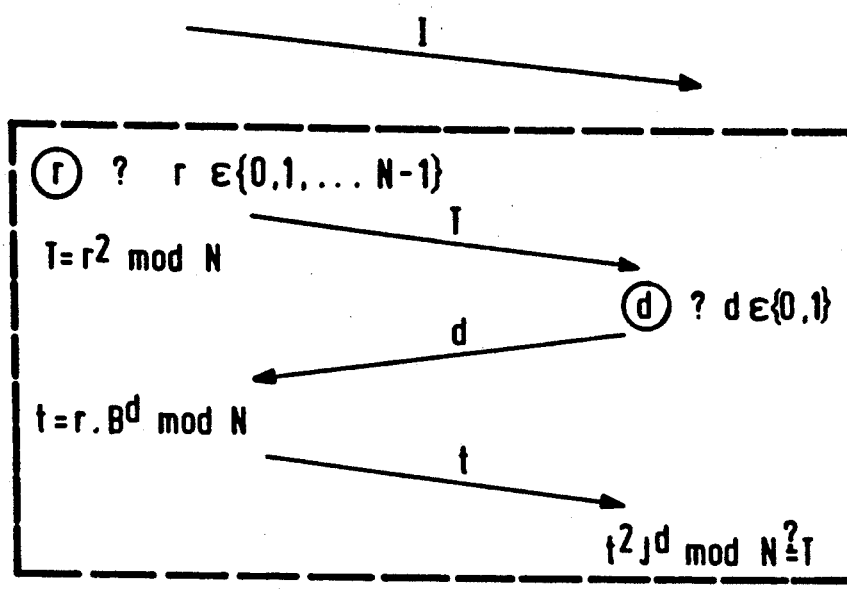
FIG. 1 represents the abovementioned probabilistic process.
Figure 2:
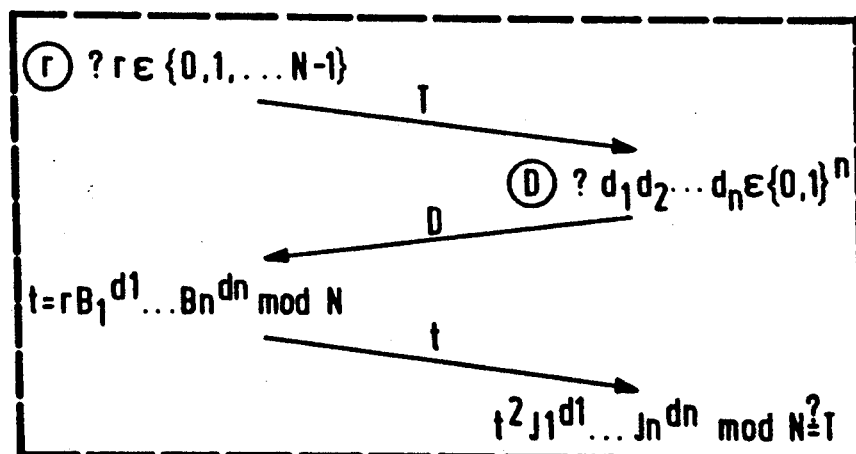
FIG. 2 likewise illustrates the FS process.
Figure 3:
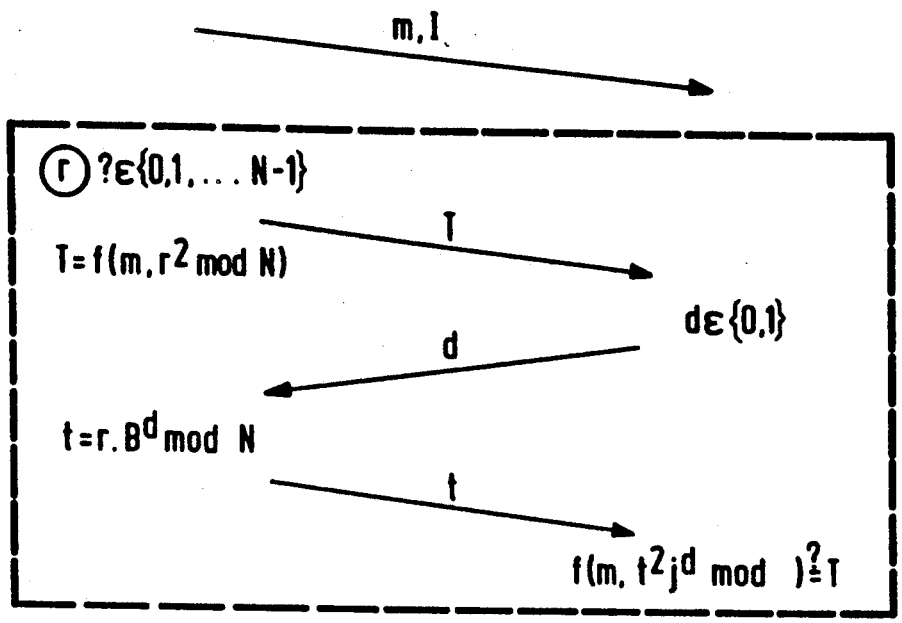
FIGS. 3, 4 likewise illustrate the processes for the techniques S and FS.
Figure 4:
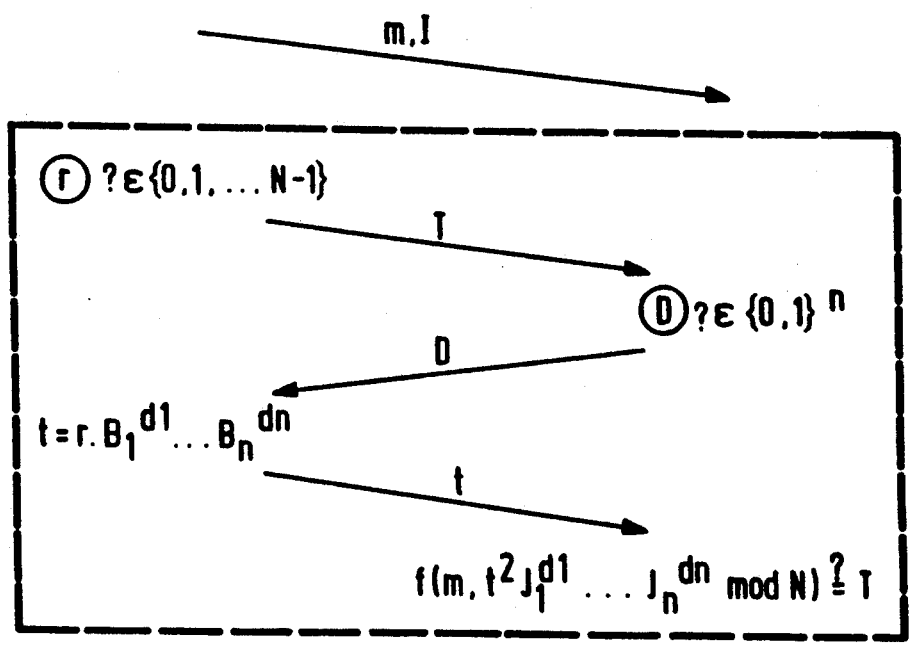
Figure 7:
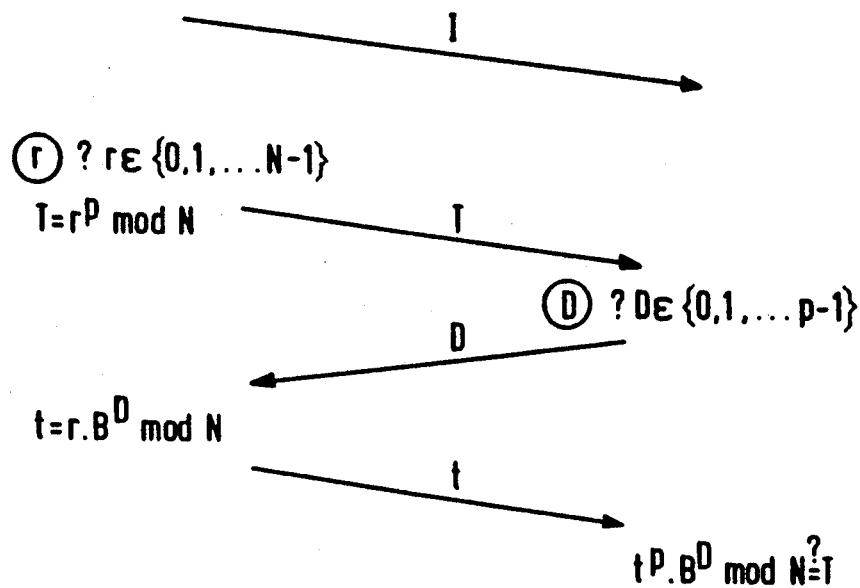
FIG. 7 illustrates a process for the authentication of an accreditation.
Figure 8:
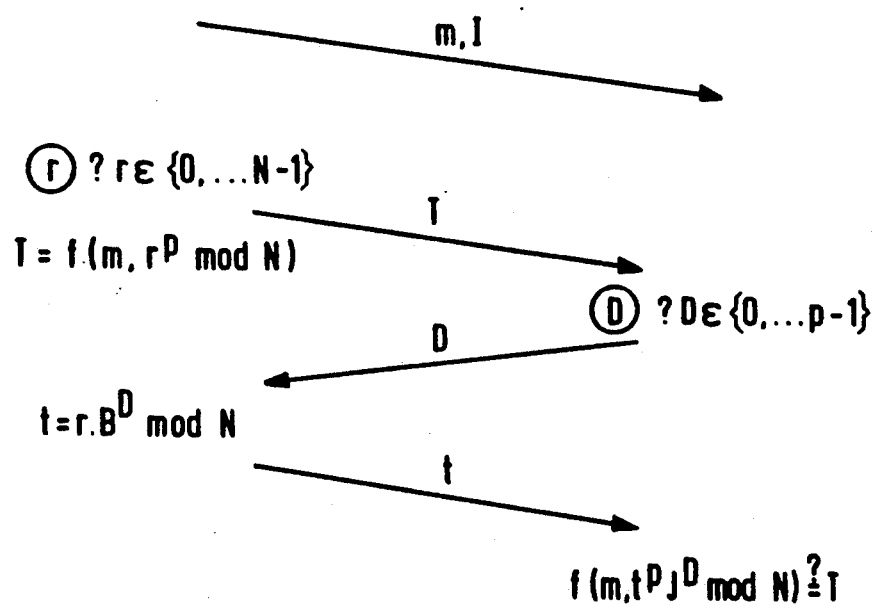
FIG. 8 illustrates a process for the authentication of a message.
Figures 9, 10:
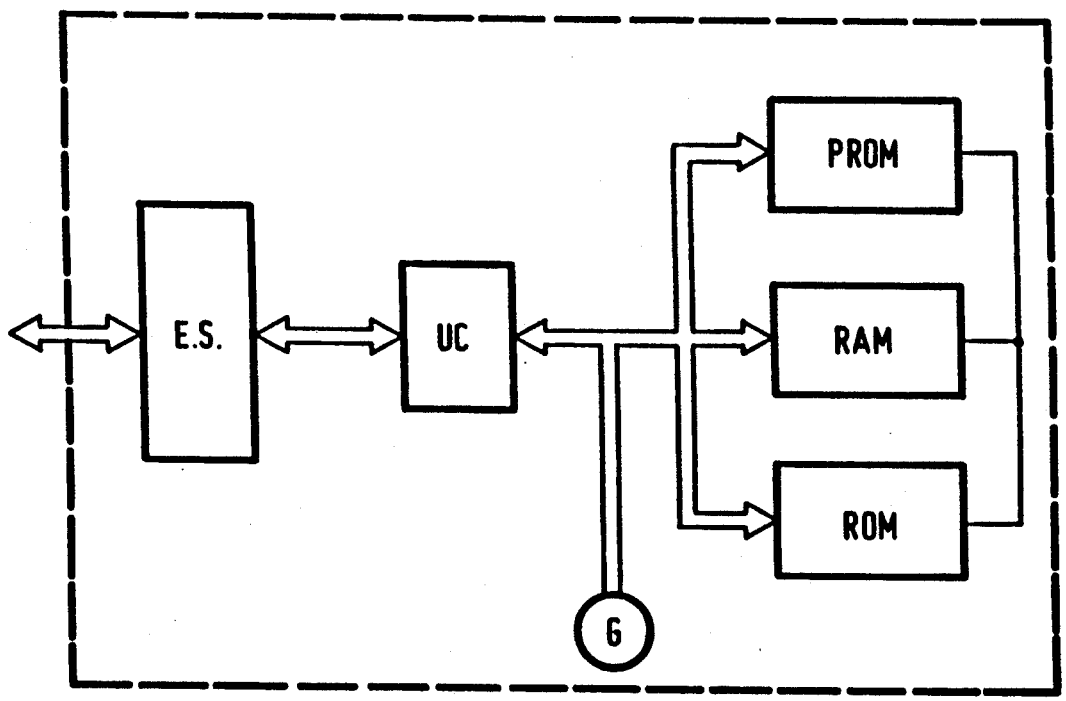
FIG. 9 illustrates a process for signing a message.
FIG. 10 shows diagrammatically an assembly permitting the implementation of the processes of the invention.

The interface of the chip card is standardized by the series of international standards ISO/CEI 7816, "Cartes a circuit(s) inte'gre'(s) a contacts", and more specifically by the international standard ISO/CEI 7816-3 "Cartes a circuit(s) inte'gre'(s) a contacts, Section 3: Signaux e'lectroniques et protocoles de transmission", published in September 1989.

This standard prescribes that the commands are obtained from the exterior with a header of five bytes. The card responds by a procedural byte. Thereafter, a certain number of data bytes are exchanged in one single direction. Finally the card terminates the commands by two bytes giving its state at the end of the commands.

Consequently, "entering" commands during the execution of which the data enter into the card and "leaving" commands during the performance of which data leave the card are then different commands.

To realise the method of the invention within the framework of the standard, the card therefore first emits, under the control of the leaving command, a certificate towards the security module, thereafter receives, under control of an entering command, the certificate emitted by the security module. In actual practice, the security module is also realised in the form of a chip card. The security module then receives, under the control of an entering command, the certificate emitted by the card and thereafter emits, under the control of a leaving command, the certificate having the card for its destination. There is no reason to doubt the security of the machines receiving the cards and the security module, nor the security of the connections used between these machines.

The different stages of the procedure according to the invention can then be as follows, in the specific cases chosen by way of example:

A) First stage, effected by the chip card.

The chip card randomly selects a positive exponent x less than p (first number of the finite set) and calculates the corresponding exponential X:

$$X = a^x \bmod p.$$

Thereafter, the card signs the value X and any message M to be transmitted to the security module. To that effect, the card randomly selects an element r from the set of integers mod*n, and calculates mod*n the $v^{th}$ power of this element. The result is the initial evidence Tb. Thereafter, the card applies a compression function "Hash" to a bit train containing the exponential X, the optional message M and the initial evidence Tb. From this result the card develops a initial pseudo-challenge db having a value from 0 to v−1, for example by selecting its least significant bits. Finally, the card calculates mod*n the product of the element r and the $db^{th}$ power of its secret accreditation Bc. The result is the answer D.

There are therefore the following relations:

$$Tb = r^v \bmod *n;$$

$$db = \text{select } (\text{Hash } (X, M, Tb));$$

$$D = r\, Bc^{db} \bmod *n.$$

B) First data transfer.

The chip card transmits, towards the security module, a certificate which is a bit train containing the credential Crc, the value X, the optional message M, the initial pseudo-challenge db and the answer D. The two data elements db and D then sign X and M.

C) Second computational stage, effected by the security module.

The security module calculates mod*n the product of the $v^{th}$ power of the answer D and the $db^{th}$ power of the representative Jc corresponding to the credential Crc. The result is the final evidence Tf. Thereafter the security module applies the compression function "Hash" to a bit train containing the exponential X, the optional message M and the final evidence Tf. The final pseudo-challenge df is obtained by selecting the bits in the same manner as was effected by the card.

There are therefore the following relations:

$$Jc = \text{Red}(Crc);$$

$$Tf = D^v\, Jc^{db} \bmod *n;$$

$$df = \text{select } (\text{Hash}(X, M, Tf)).$$

The security module agrees to continue the processing operation if and only if the final pseudo-challenge df is effectively equal to the initial pseudo-challenge db. In this case the chip card has properly been signed X and M and the certificate it has emitted is correct.

Then the security module randomly selects a positive exponent y less than p, and calculates the corresponding exponential Y. Thereafter it raises X to the power y in the member to obtain the common transitory key K. The transitory key K can be extended by diversification thanks to the compression function by Hash (K, 1), Hash (K, 2), Hash (K, 3), . . . . Thereafter it calculates the cryptogram which is then transmitted to the card. For example the cryptogram C will be obtained from the exclusive-OR of the common transitory key K and of the secret S.

There are therefore the following relations:

$$Y = a^y \bmod p;$$

$$K = X^y \bmod p = a^{xy} \bmod p;$$

$$C = SO + K.$$

The security module then signs the useful data, namely the exponential Y and a further optional message M' to be transmitted to the card and the cryptogram C. To effect this, it randomly selects an element r' from the set of integers mod*n' and calculates mod*n' the $v^{th}$ power of this element. The result is the initial evidence Tb'.

The security module then applies the compression function "Hash" to a bit train containing the expotential y, the optional message M', the cryptogram C and the initial evidence Tb'. From the result of this compression, the security module develops an initial pseudo-challenge db' having a value from 0 to v'−1, for example by selecting the least significant bits. Finally, it calculates mod*n' the product of the multiplication of the element r' by the $db'^{th}$ power of its secret accredition Bm. The result is the answer D'.

There are therefore the following relations:

$$Tb' = r'^v \bmod *n';$$

$$db' = \text{select } (\text{Hash}(Y, M', C, Tb'));$$

$$D' = r'\, Bm^{db'} \bmod *n.$$

D) Second data transfer.

The security module transmits towards the card a certificate which is a bit train containing the credential Trm, the exponential Y, the optional message M', the cryptogram C, the initial pseudo-challenge db' and the answer D'. The two data elements db' and D' then sign the values Y, M' and C. And only the card will be able the reconstitute the secret S, as only the card knows the exponent x.

E) Third calculation stage, effected by the card.

The card calculates mod*n' the product of the multiplication of the v'th power of the answer D' and the db'th power of the representative Jm corresponding to the credential Crm. The result is the final evidence Tf'.

Thereafter the card applies the compression function "Hash" to a bit train containing the values Y, M', C and the final evidence Tf'. The final pseudo-challenge df' is obtained by selecting the bits in the same manner as was performed by the security module.

There are therefore the following relations:

$$Jm = \text{Red}(Crm);$$

$$Tf' = D'^v\, Jm^{db'} \bmod *n';$$

$$df' = \text{select } (\text{Hash}(Y, M', C, Tf')).$$

The card agrees to continue the processing operation if and only if the final pseudo-challenge df' is equal to the initial pseudo-challenge db'. If so, the security module has effectively signed Y, M' and C and the certificate it has emitted is correct.

The card raises Y to the power x in the field chosen to obtain the common transitory secret key K. Optionally, the transitory key K is extended in the same manner as in the security module. Thereafter it re-establishes the secret S by an OR-exclusive operation of the cryptogram C and of the common transitory key K.

Finally, the card performs the action controlled by the module, for example, writing of the secret S into its memory as a new key with a view to the subsequent calculations.

There are therefore the following relations:

$$K = Y^x \bmod p = a^{xy} \bmod p;$$

$$S = C \ominus K.$$

The procedure just described can be slightly modified to allow the transfer of a secret from a security module towards a chip card, without interaction, thanks to the use of a directory. Actually, in radio broadcasting, interactions between security modules and cards are impossible. In addition, the entity managing the subscribers has at its disposal an information file, a sort of directory, to act on the cards of the users. It is therefore, advantageously possible to utilise the method just described, on the condition that writing into the directory corresponds to the first stage (A) and to the first data transfer (B), the use of the directory corresponding to the second calculating stage (C), to the second data transfer (D) and to the third calculation stage (E).

Although they are particularly desirable for the broadcasting applications these variants have equally proved to be useful in pay systems and electronic mail.

As regards broadcasting methods and the reception of title managing messages, reference is made to the document FR-A-2 632 148, corresponding to U.S. Pat. No. 4,947,428.

In a first variant, each card enters itself its individual certificate into the directory.

In a second variant, the authority managing the security modules enters a collective certificate into the directory; it authorizes the cards of the group one by one by assigning to each card a rank in the group and by fixing a common exponent x. During broadcasting it is actually interesting to have available a shared common key present in a group of cards, with a population of some hundreds or some thousands of cards per group. In this case each card of the group then carries the address of the group, the exponent of the group, and a ranking in the group. The message M', which figures in a certificate produced by a security module, details:

the action the cards of the group have to execute, (for example the renewal of a subscription);

the identification of the group of cards to which the certificate is addressed (the address of the group);

and an indexing field having a number of bits equal to or higher than the maximum rank assigned in the group.

Reverting to the non-interactive transfer method, its main stages are then the following:

To form a collective certificate, the authority employs a further security module, in which the exponent x is fixed beforehand, as the exponent of the group. In this case, the optional message M comprises the information components describing the different cards constituting the group. When a new card is added to a group, it is sufficient to produce a new collective certificate to update the file of the managing centre.

A card receiving a collective certificate originating from a security module checks whether the intended action has not already been executed by it, if this certificate is addressed to the group to which it belongs and if the bit corresponding to its rank is indeed in the active state in the indexing field. Then only it utilises the certificate.

The non-interactive transfer method then includes the following main stages:

A) Writing into the directory by a chip card or by an authority having created a group.

The production of a certicate corresponds to the first stage A) described in the foregoing. These calculations for the formation of an individual certificate by a card will now be briefly reviewed:

The chip card randomly selects a positive exponent x less than p, and calculates the corresponding exponential $X = a^x \bmod p$, The chip card signs the value X and any message M to be transmitted to the security module; to effect this, it randomly selects an element r from the set of integers mod*n, and calculates mod*n the $v^{th}$ power of this element; the result is the initial evidence Tb, The card applies a compression function "Hash" to a bit train containing the exponential X, the optional message M and the initial evidence Tb, From the result, the card develops an initial pseudo-challenge db having a value from 0 to v−1, for example by selecting the least significant bits;

The card calculates mod*n the product of the multiplication of the element r by the $db^{th}$ power of its secret accreditation Bc, the result is the answer D;

The chip card enters in its directory the certificate which is a bit train comprising the credential Crc, the value X, the optional message M, the initial pseudo-challenge db and the answer D; the two elements db and D then sign X and M.

The chip card must obviously store in its memory the secret exponent x and several information components figuring in the optional message M, such as the limited validity dates and the restrictions imposed on usage.

The directory is thus constituted by a collection of certificates, individual and collective, which can be verified at any instant.

B) Use of the directory by a security module for the distribution of its secrets.

The use of the directory is effected in two stages: first the verification of the certificate present in the directory, thereafter the development of the certificate which will produce an action on a card or on a group of cards. The first stage is conditional: the certificates of the directory are only verified if this is necessary.

The different operations are then as follows:

a) verification of a certificate of the directory by the security module:

the security module calculates mod*n the product of the $v^{th}$ power of the answer D and the $db^{th}$ power of the representative Jc corresponding to the credential Crc; the result is the final evidence Tf;

the security module applies the compression function "Hash" to a bit train containing the exponential X, the optional message M and the final evidence Tf; the final pseudo-challenge db is obtained by selecting the bits in the same manner as the card;

the security module agrees to continue if, and only if, the final pseudo-challenge df is effectively equal to the initial pseudo-challenge db; the chip card has properly signed X and M, the certificate of the directory is correct.

b) Preparing a certificate for action on a chip card or on a group of cards:

the security module randomly selects a positive exponent y less than p and calculates the corresponding exponential Y; thereafter it raises X to the power y in the member for obtaining the common transitory key K; the transitory key K may be extended by diversification thanks to the Hash (K, 1), Hash (K, 2) Hash (K, 3), . . . compression function;

it calculates the cryptogram which will be transmitted to the card; for example the cryptogram C results from the exclusive-OR operation of the common transitory key K and of the secret S;

finally, the security module signs the set of useful data, namely the exponential Y, a further optional message M' to be transmitted to the card and the cryptogram C; to effect this, it randomly selects an element r' from the set of integers mod*n', and calculates mod*n' the $v^{th}$ power of this element; the result is the initial evident Tb';

it applies the "Hash" compression function to a bit train containing the exponential Y, the optional message M', the cryptogram C and the initial evidence db' having a value from 0 to v'−1, for example by selecting the least significant bits;

it calculates mod*n' the product of the element r' by the db'$^{th}$ power of its secret accreditation Bm; the result is the answer D'.

c) Transmission of the certificate from the security module towards a chip card or towards a group of cards;

The security module issues a certificate which is a bit train containing the credential Crm, the exponential Y, the optional message M', the cryptogram C, the initial pseudo-challenge db' and the answer D'. The two elements db' and D' sign the values Y, M' and C. It is necessary to have the exponent x available to recover the secret S.

d) Use of a certificate by a chip card:

If the certificate is used collectively, the card considers that the commanded action has not yet been effected if the certificate refers to a group and if the index corresponding to its rank in the group is in the active state;

the card then calculates mod*n' the product of the v'th power of the response D' by the db'th power of the representative Jm corresponding to the credential Crm; the result is the final evidence Tf;

The card applies the "Hash" compression function to a bit train containing the values Y, M', C and the final evidence Tf; the final pseudo-challenge df is obtained by selecting the bits in the same manner as the security module has done;

the card agrees to continue if and only if the final pseudo-challenge df is equal to the initial pseudo-challenge db', the security module has effectively signed Y, M' and C and the certificate issued is correct;

the card raises Y to the power x in the field to obtain the common transitory key K; optionally the transitory key K is extended in the same manner as was effected by the security module;

the card re-establishes the secret S by an exclusive-OR operation of the cryptogram C and of the common transitory key K, as was effected by the security module;

finally, the card undertakes the action commanded by the module, for example writing the secret S in its memory as a new key with a view to later calculations.

It should be noted that the directory thus defined can be utilised by a security module to manage its rights. Actually, in broadcasting, the problem of information management occurring most frequently consists in the management of the rights in the cards. Now, to manage these rights, there is no need to transmit a secret. This latter mechanism may alternatively be considered as being a simplification of the preceding mechanism. It is a direct application of the signature GQ and will complete the preceding mechanisms.

The card accepts the certificates issued by a security module which has been accredited by the authority having published the public verfication key and which presents the required credentials in terms of objective and validity periods.

The cards are organised in groups and each card has a rank in the group. The message M' present in the certificate issued by the security module counts the address of the group and a bit field which is at least as numerous as the maximum rank assigned in the group. Thus, each card can recognise if the message refers to its group and if the message refers to it in the group, in accordance with the stage of the bit corresponding to its rank.

The message M' furthermore prescribes the action to be undertaken in the card, for example the renewal of a description, the inscription of a credential, the provision of tickets to be used at a later instant, . . . . . In the credentials of the security module, the authority has defined the actions the module is entitled to undertake.

We claim:

1. A method of secured transfer of information S to a first microcomputer belonging to a chip card from a second microcomputer belonging to a security module, the first and second microcomputers establishing reciprocal authentication, this method being characterized in that:

a) a first authority is entitled to issue cards which have previously been provided with a first public key constituted by a first modulus n, a first verification exponent v and a first signature exponent s, each card having been defined by an accreditation Bc obtained by signature of a credential Crc, which signature can be verified with the aid of this first public key, b) a second authority is entitled to issue security modules which have also previously been provided with a second public key constituted by a second modulus n', a second verification exponent v' and a second signature exponent s', the security module having been defined by an accreditation Bm obtained by signature of a credential Crm, which signature can be verified with the aid of the second public key, c) finally, the first and second microcomputers have previously publicly agreed to use exponentials in a finite set suitable to establish a common transistory key, d) this method comprises the following steps:

A) in a first computational stage, realized by the first microcomputer, calculating an exponential X, an optional message M and a calculated signature from the exponential X and the optional message M, this signature being verifiable with the aid of the first public key, B) in a first data transfer, transmitting, from the first microcomputer to the second microcomputer, a first certificate which comprises the credentials of the card Crc, as well as the calculated signature, C) in a second computational stage, realized by the second microcomputer,
  i) verifying, with the aid of the first public key, whether the certificate received by the second microcomputer has been properly signed by the card, and,
  ii) if so, calculating the exponential of the exponential X, which constitutes a common transistory key,
  iii) then calculating an optional message M′ and the second microcomputer's own exponential Y,
  iv) thereafter working out a cryptogram C from the common transistory key K and from the information S to be transmitted, and
  v) signing the optional message M′, the exponential of the second microcomputer Y and the cryptogram C, D) in a second data transfer, transmitting, from the second microcomputer to the first microcomputer, a second certificate which comprises the credential of the security module Crm as well as the signed exponential of the second microcomputer Y, optional message M′ and cryptogram C, E) in a third computational stage, realized by the first microcomputer,
  i) verifying with the aid of the second public key, whether the second certificate received from the second microcomputer has been properly signed by the second microcomputer,
  ii) if so, calculating the exponential of the exponential Y received from the second microcomputer, which gives the common transistory key K; and
  iii) extracting, from the cryptogram C using the common transistory secret K, the information S which is contained in the cryptogram C and which is intended for the first microcomputer, all of the variables herein representing integers.

2. A method as claimed in claim 1, characterized by the fact that the first and second authorities are one and the same.

3. A method as claimed in claim 1, characterized in that
  A) the first calculation stage includes,
    i) randomly selecting an element r from the set of integers $\mod^* n$
    ii) calculating the $v^{th}$ power of this element r, to yield an initial evidence Tb (Tb=$r^v \mod^* n$),
    iii) applying a compression function ("Hash") to a bit train containing the exponential X, the optional message M and the initial evidence Tb,
    iv) developing an initial pseudo challenge db having a value from 0 to v−1, (db=select-(Hash(X,M,Tb)) by selecting bits from the result of the compression, and
    v) calculating $\mod^* n$ the product of the element r by the $db^{th}$ power of the first microcomputer's accreditation Bc, the result being an answer D, (D=$r \cdot Bc^{db} \mod^* n$) and
  B) the first certificate is a bit train containing the credential of the card Crc, the value of the exponential X, the optional message M, the initial pseudo-challenge db and the answer D, the initial pseudo-challenge db and the answer D signing the exponential (X) and the optional message (M).

4. A method as claimed in claim 1, characterized in that
  in step d)C)iv), the second microcomputer calculates the cryptogram C from the common transistory key K and from the information S by an exclusive-OR operation between S and K,
  in step d)E)iii), the first microcomputer extracts the information S from the cryptogram C by the same exclusive-OR operation between the cryptogram C and the common transistory key K.

5. A method as claimed in claim 1, further comprising the steps of
  defining each card by a representative Jc obtained by redundancy of the credential (Jc=Red(Crc)),
  in the entitled authority, raising the representative Jc to a power −s $\mod^* n$, to yield the accreditation Bc (Jc·$Bc^v \mod^* n$=1),
  defining each security module by a representative Jm obtained by redundancy of the credential of the security module (Jm=Red(Crm)),
  in the entitled authority, raising the representative Jm to a power −s′ $\mod^* n'$, to yield an accreditation Bm (Jm·$Bm^{v'} \mod^* n'$=1).

6. A method as claimed in claim 3 wherein
  C) the second computational stage includes
  i) to verify that the first certificate is correct
    α) calculating $\mod^* n$ the product of the $v^{th}$ power of the answer D by the $db^{th}$ power of its representative Jc, to yield a final evidence Tf (Tf=$D^v Jc^{db} \mod^* n$),
    β) applying the compression function ("Hash") to a bit train containing the exponential X, the optional message M, and the final evidence Tf,
    γ) developing a final pseudo-challenge df having a value from 0 to v−1 by selecting bits of the result of the compression, (df=select (Hash(X,M,TF))),
    δ) accepting continuation of processing if, and only if, the final pseudo-challenge df is equal to the initial pseudo-challenge db, which indicates that the first microcomputer has properly signed the exponential X and the message M, and therefore that the first certificate is correct,
  v) to sign the optional message M′, the exponential Y, and the cryptogram C
    α) randomly selecting an element r′ from the set of integers $\mod^* n'$,
    β) calculating $\mod^* n'$ the $v'^{th}$ power of this element, to yield an initial evidence Tb′, (Tb′=$r'^{v'} \mod^* n'$),
    γ) applying the compression function ("Hash") to a bit train containing the exponential Y, the optional message M′, the cryptogram C, and the initial evidence Tb′, (Hash(Y,M′,C,Tb),
    δ) developing an initial pseudo-challenge db′ having a value from 0 to v′−1 from bits of the result of the compression, (db'=select(Hash-(Y,M',C,Tb'))), ε) calculating mod*n' the product of the element r' by the db'$^{th}$ power of the accreditation of the module Bm to yield an answer D', (D'=r'Bm$^{db'}$ mod*n'), D) the second certificate comprises a bit train containing the credential of the module CRM, the exponential of the second microcomputer Y, the optional message M', the cryptogram C, the initial pseudo-challenge db', the answer D', the two data elements db' and D' signing the exponential of the second microcomputer Y, the optional message M' and the cryptogram C.

7. A method as claimed in claim 6, characterized in that the third computational stage includes i) as part of verifying the second certificate α) calculating mod*n' the product of the v'$^{th}$ power of the answer D' by the db'$^{th}$ power of the representative of the module Jm corresponding to the credential of the security module Crm to yield a final evidence Tf', (Tf'=D'$^{v'}$Jm$^{db'}$mod*n), β) applying the compression function ("Hash") to a bit train containing the exponential of the second microcomputer Y, the optional message M', the cryptogram C, and the final evidence Tf', γ) developing a final pseudo-challenge df' having a value from 0 to v'−1 from bits of the result of the compression, (df'=select(Hash-(Y,M',C,Tf'))), δ) accepting continuation of processing if, and only if, the final pseudo-challenge df' is equal to the initial pseudo-challenge db', which indicates that the second microcomputer has properly signed the exponential X, the optional message M', and the cryptogram C, and therefore that the second certificate is correct.

8. A method of secured transfer of information to a first microcomputer belonging to a chip card from a second microcomputer belonging to a security module, the first and second microcomputers establishing reciprocal authentication, this method being characterized in that:

a) a first authority is entitled to issue cards which have previously been provided with a first public key constituted by a first modulus n, a first verification exponent v and a first signature exponent s, each card having been defined by an accreditation Bc obtained by signature of a credential Crc, which signature can be verified with the aid of this first public key, b) a second authority is entitled to issue security modules which have also previously been provided with a second public key constituted by a second modulus n', a second verification exponent v', and a second signature exponent s', a security module having been defined by an accreditation Bm obtained by signature of a credential Crm, which signature can be verified with the aid of the second public key, c) the first and second microcomputers have previously publicly agreed to use exponentials in a finite set suitable to establish a common transitory key, d) this method comprises the following steps:

A) in the second microcomputer, i) retrieving a stored first certificate including credentials of the card Crc and a signature of an exponential X and an optional message M, ii) verifying with the aid of the first public key whether the first certificate has been properly signed, iii) if so, calculating the exponential of the exponential X to yield a common transitory key K, iv) then calculating an optional message M' and the second microcomputer's own exponential Y, v) thereafter working out a cryptogram C from the common transitory key K and from the information S to be transmitted, and vi) signing the optional message M', the exponential of the second microcomputer Y' and the cryptogram C, B) transmitting, from the second microcomputer to the first microcomputer, a second certificate which comprises the credential of the security module Crm as well as the signed exponential of the second microcomputer Y, optional message M', and cryptogram C, C) in the first microcomputer, i) verifying with the aid the of the second public key, whether the second certificate received from the second microcomputer has been properly signed by the second microcomputer, ii) if so, calculating the exponential of the exponential Y received from the second microcomputer, to yield the common transitory key K, and iii) extracting, from the cryptogram C using the common transitory key K, the information S which is contained in the cryptogram C and which is intended for the first microcomputer, all of the variables herein representing integers.

9. The method of claim 8 wherein the first and second authority are one and the same.

10. A method as claimed in claim 8, further comprising the steps of defining each card by a representative Jc obtained by redundancy of the credential (Jc=Red(Crc)), in the entitled authority, raising the representative Jc to a power −s mod*n, to yield the accreditation Bc (Jc·Bc$^v$ mod*n=1), defining each security module by a representative Jm obtained by redundancy of the credential of the security module (Jm=Red(Crm), in the entitled authority, raising the representative Jm to a power −s' mod*n', to yield an accreditation Bm (Jm·Bm$^{v'}$mod*n'=1).

11. A method as claimed in claim 8 wherein d)A)i) the first certificate is a bit train containing the credential of the card CRC, the value of the exponential X, the optional message M, an initial pseudo-challenge db and an answer D, the initial psuedo challenge db and the answer D signing the exponential X and the optional message M, where $$D = r \cdot Bc^{db} \bmod{}^* n$$

r is an element chosen at random from the set of integers mod*n db=select (Hash(X,M,Tb)) and has a value from 0 to v−1 select is a function selecting bits from its argument

Hash is a compression function

Tb=r$^v$ mod*n

A)ii), the verifying step, includes

α) calculating mod*n the product of the v$^{th}$ power of the answer D by the db$^{th}$ power of its representative Jc, to yield a final evidence Tf (Tf=$D^v Jc^{db}$ mod*n), β) applying the compression function ("Hash") to a bit train containing the exponential X, the optional message M, and the final evidence Tf, γ) developing a final pseudo-challenge df having a value from 0 to v−1 by selecting bits of the result of the compression, (df=select (Hash(X,M,TF))), δ) accepting continuation of processing if, and only if, the final pseudo-challenge df is equal to the initial pseudo-challenge db, which indicates that the first microcomputer has properly signed the exponential X and the message M, and therefore that the first certificate is correct, vi) to sign the optional message M', the exponential Y, and the cryptogram C α) randomly selecting an element r' from the set of integers mod*n', β) calculating mod*n' the $v'^{th}$ power of this element, to yield an initial evidence Tb', (Tb'=$r'^{v'}$ mod*n'), γ) applying the compression function ("Hash") to a bit train containing the exponential Y, the optional message M', the cryptogram C, and the initial evidence Tb', (Hash(Y,M',C,Tb)), δ) developing an initial pseudo-challenge db' having a value from 0 to v'−1 from bits of the result of the compression, (db'=select (Hash-(Y,M',C,Tb'))), ε) calculating mod*n' the product of the element r' by the $db'^{th}$ power of the accreditation of the module Bm to yield an answer D', (D'=$r'Bm^{db'}$ mod*n'), B) the second certificate comprises a bit train containing the credential of the module CRM, the exponential of the second microcomputer Y, the optional message M', the cryptogram C, the initial pseudo-challenge db', the answer D', the two data elements db' and D' signing the exponential of the second microcomputer Y, the optional message M' and the cryptogram C.

12. A method as claimed in claim 6, characterized in that d)C)i) verifying the second certificate includes α) calculating mod*n' the product of the $v'^{th}$ power of the answer D' by the $db'^{th}$ power of the representative of the module Jm corresponding to the credential of the security module Crm to yield a final evidence Tf', (Tf'=$D'^{v'}Jm^{db'}$mod*n), β) applying the compression function ("Hash") to a bit train containing the exponential of the second microcomputer Y, the optional message M', the cryptogram C, and the final evidence Tf', γ) developing a final pseudo-challenge df' having a value from 0 to v'−1 from bits of the result of the compression, (df'=select (Hash(Y,M',C,Tf'))), δ) accepting continuation of processing if, and only if, the final pseudo-challenge df' is equal to the initial pseudo-challenge db', which indicates that the second microcomputer has properly signed the exponential X, the optional message M', and the cryptogram C, and therefore that the second certificate is correct.

13. The method of claim 8 wherein, in order to store the first certificate in the directory, the second authority performs the following steps:

assigning to each card a rank in a group of cards, assigning a common exponent x to the group, and calculating a collective certificate valid for the group, with the aid of an auxiliary microcomputer and based on using the exponent x as the exponent for the whole group.

14. The method of claim 8 wherein the finite set is a finite field having a first number p as its characteristics and a base which is a primitive element a of the field, the exponent X satisfies the equation X=$a^x$ mod p, where x is a positive exponent less than p, step d)A)iv) comprises selecting a positive integer y less than p and calculating the exponential of the second microcomputer according to the equation Y=$a^y$ mod p, step d)A)iii) comprises calculating the common transitory key according to the equation K=$(a^x)^y$ mod p, and step d)C)ii) comprises calculating the common transitory key according to the equation K=$(a^y)$x mod p.

15. The method of claim 1 wherein the finite set is a finite field having a first number p as its characteristics and a base which is a primitive element a of the field, step d) A) comprises calculating the exponent X according to the equation X=$a^x$ mod p, where x is a positive exponent less than p, step d)C)v) comprises selecting a positive integer y less than p and calculating the exponential of the second microcomputer according to the equation Y=$a^y$ mod p, step d)C)iv) comprises calculating the common transitory key according to the equation K=$(a^x)^y$ mod p, and step d)E)ii) comprises calculating the common transitory key according to the equation K=$(a^y)$x mod p.

16. A method as claimed in claim 8, characterized in that in step d)A)v), the second microcomputer calculates the cryptogram C from the common transitory key K and from the information S by an exclusive-OR operation between S and K, in step d)C)iii), the first microcomputer extracts the information S from the cryptogram C by the same exclusive-OR operation between the cryptogram C and the common transitory key K.

* * * * *

UNITED STATES PATENT AND TRADEMARK OFFICE
CERTIFICATE OF CORRECTION

PATENT NO. : 5,218,637
DATED : June 8, 1993
INVENTOR(S) : Didier Angebaud, et al.

It is certified that error appears in the above-indentified patent and that said Letters Patent is hereby corrected as shown below:

On the title page, item [73] Assignee: Add --; Télédiffusion France S.A., Paris, France; and U.S, Philips Corporation, New York, NY--.

Signed and Sealed this

Eleventh Day of October, 1994

Attest:

Attesting Officer

BRUCE LEHMAN

Commissioner of Patents and Trademarks